Aug. 12, 1952     A. B. MANUPELLO     2,606,602
PNEUMATIC TIRE BEAD LOOSENING TOOL
Filed May 25, 1950     2 SHEETS—SHEET 1
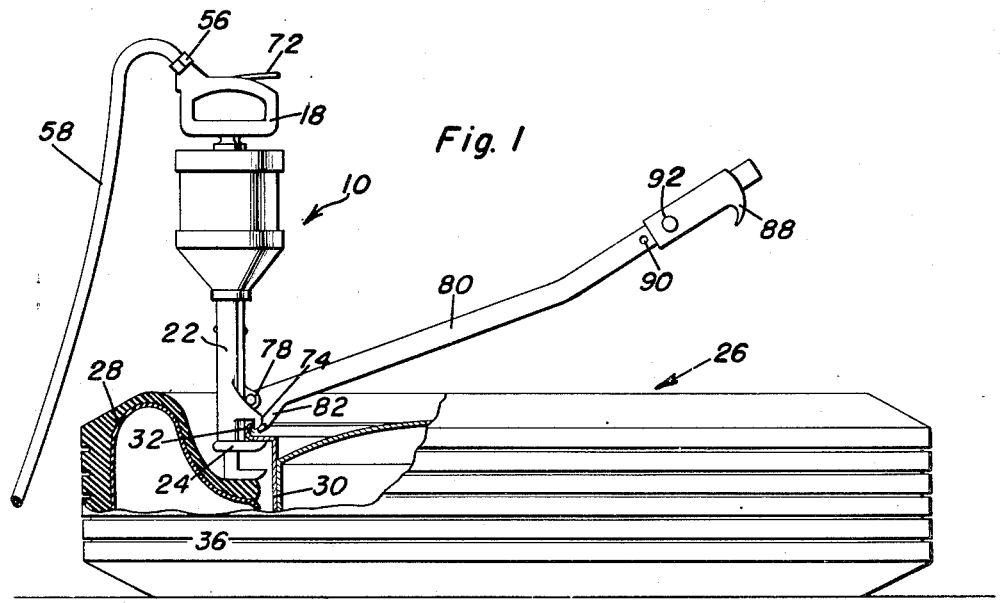
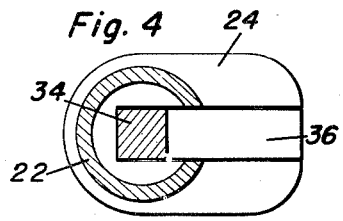
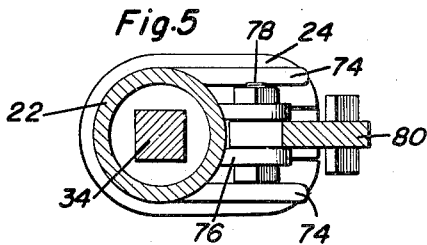
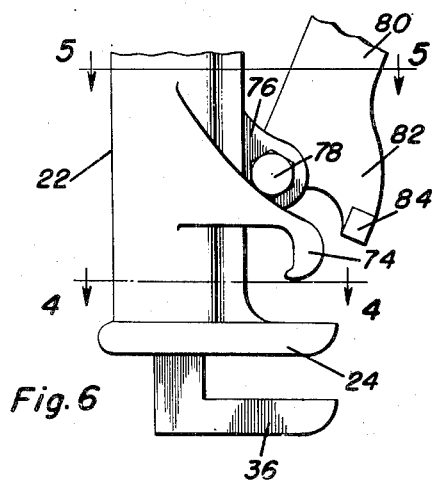
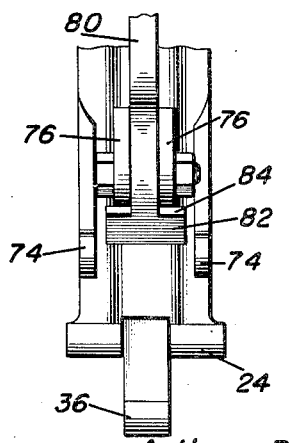
Anthony B. Manupello
INVENTOR.

Aug. 12, 1952 — A. B. MANUPELLO — 2,606,602
PNEUMATIC TIRE BEAD LOOSENING TOOL
Filed May 25, 1950 — 2 SHEETS—SHEET 2
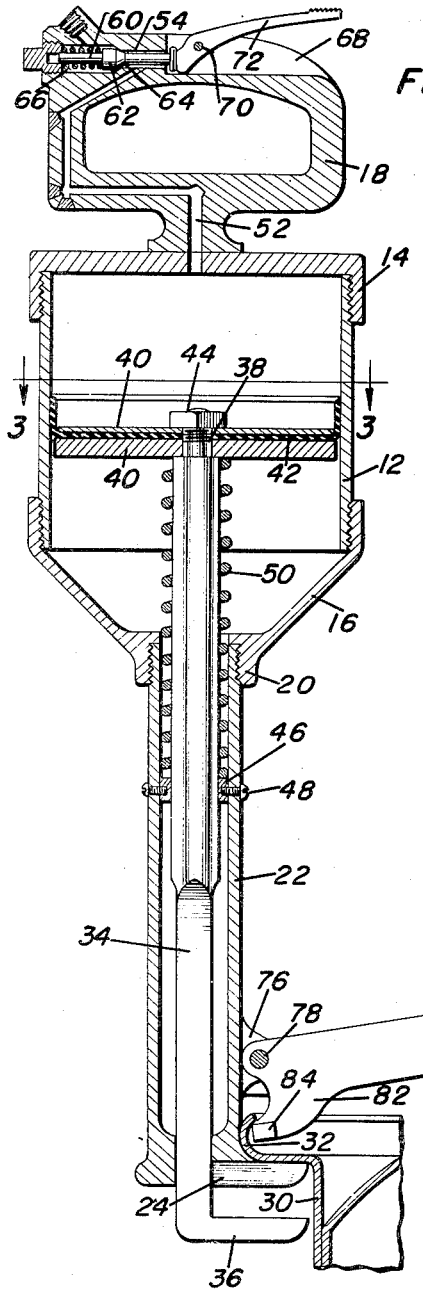
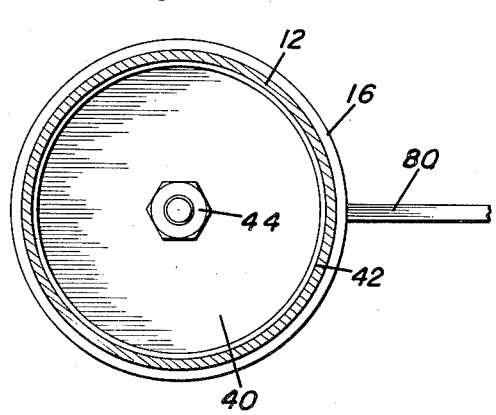
Anthony B. Manupello
INVENTOR.

Patented Aug. 12, 1952

2,606,602

UNITED STATES PATENT OFFICE 2,606,602

PNEUMATIC TIRE BEAD LOOSENING TOOL

Anthony B. Manupello, Penns Grove, N. J.

Application May 25, 1950, Serial No. 164,110

1 Claim. (Cl. 157—1.17)

1

This invention relates to a novel pneumatic tool for removing a tire from its rim and constitutes an improvement on the application Serial No. 83,890, filed March 28, 1949.

The primary object of this invention is to provide a pneumatic tool for removing a tire from its rim which does away with the use of tire irons and the hazards incident to the use thereof.

A further object of this invention is to provide a pneumatic tire gun which is light in weight, compact, and easy to operate, inasmuch as all that is required is the depression or release of a lever on a handle.

The present tool is an improvement over the pneumatic tire gun described and claimed in application Serial No. 83,890 in that it supplies a means for locking the tool on the rim so that the tool may be rocked on the tire to remove the same from the rim. No such locking means has been provided in the previous tire gun, and it has been found in practice that this means is essential to prevent the pneumatic tool from slipping off the rim as it is rocked to remove the tire from the rim. The present tool employs a relatively long lever arm with a hook thereon as the locking means and further includes an adjustable hook member on the free end of the lever arm which is adapted to engage the rim at a point diametrically opposite the rim which has been engaged by the major portion of the tool so that the rim can be loosened and effectively removed from the tire.

These, together with various ancillary objects and features of the invention which will later become apparent as the following description proceeds, are attained by the device, a preferred embodiment of which has been illustrated by way of example only in the accompanying drawings, wherein:

Figure 1 is a side elevational view of the tool, parts of the tire being broken away and shown in section to show details of construction;

Figure 2 is a longitudinal sectional view through the tool, parts being broken away and shown in elevation;

Figure 3 is a sectional view taken substantially on the plane of section line 3—3 of Figure 2;

Figure 4 is a sectional view taken substantially on the plane of section line 4—4 of Figure 6;

Figure 5 is a sectional view taken substantially on the plane of section line 5—5 of Figure 6;

Figure 6 is an enlarged fragmentary side elevational view of the bottom portion of the tool; and Figure 7 is an end elevational view looking from the right on Figure 6.

2

Specific reference is now made to the drawings. In the several views in the accompanying drawings and in the following specification similar reference characters indicate corresponding elements throughout.

The present tool is generally indicated at 10 and includes a substantially cylindrical hollow housing 12 threaded at its upper and lower ends to receive closure plates 14 and 16, to the upper closure plate of which is secured by any suitable means a handle 18. The closure plate 16 is downwardly tapered and includes an internally threaded socket 20 which receives the upper threaded end of a tubular member 22, the bottom end of which includes laterally extending, transversely spaced feet 24. The pneumatic tire is shown at 26 and includes an innertube 28 retained on the conventional metallic rim 30 which includes peripheral flanges 32. As shown clearly in the figures, the feet 24 are stationary and are adapted to abut the inner surface of the rim beneath the flange 32.

Slidable in the tubular member 22 through an appropriate aperture in the bottom thereof is a shank 34 having a laterally extending foot 36 which can move vertically between the laterally extending feet 24 as shown clearly in Figure 4. The upper end of the shank 34 extends into the housing 12 and is threaded as at 38. The threaded upper end 38 of the shank extends through a pair of vertically spaced plates 40 between which is positioned a leather piston 42, the piston and plates being retained upon the upper end of the shank by means of an appropriate closure nut 44. A collar 46 serving as a stop is secured within the tubular member 22 by appropriate screws 48, and a coil spring 50 is wound about the square portion of the shank 34 and interposed between the stop 46 and the lower plate 40 and is so tensioned as to normally urge the piston upwardly and consequently the foot 36 upwardly and into an inoperative position.

Extending through the handle and communicative with the interior of the housing 12 is a conduit 52 which is further communicative with a laterally extending conduit 54 in the upper portion of the handle, the latter conduit being adapted for connection by means of a suitable coupling 56 to a compressed air delivery line 58. Positioned in the conduit 54 slidably therein is a valve stem 60 carrying a valve 62 which is cooperative with a valve seat 64 and is normally urged towards the valve seat by a suitable spring 66. The valve stem extends beyond the valve seat and into a recess 68 in the handle in which is pivoted as at 70 a trigger or lever 72 which when depressed will urge the valve 62 away from the seat 64 as will be clearly evident with reference to Figure 2. Thus when the lever or trigger 72 is depressed, compressed air will enter the housing 12 and urge the piston 42 downwardly together with the shank 34 and the foot 36, the latter being adapted to press against the tire 26 and depress it as shown clearly in Figure 1. In this operative position, the tool may be rocked upon the foot 36 and about the tire 26 to loosen the same from the rim and eventually remove the rim from the tire. However, it has been found in practice that some means must be provided for locking the tool on the rim so that after substantial rocking thereof, the tool will not slip off the rim. Such a means has been provided and will be described hereinafter.

Secured to or integral with the tubular member 22 is a pair of laterally extending downwardly and inwardly curved hook members 74 which are adapted to engage the flange 32 of the rim 30 as shown clearly in Figure 1. To further securely and safely lock the tool on the flange of the rim, a pair of spaced ears 76 are provided between which is pivoted for vertical movement as at 78 one end of a relatively long lever arm 80 which is further provided with a depending hook portion 82 adjacent the pivoted end, the hook portion 82 including a laterally extending member 84 adapted to underride the spaced hook members 74 and lockingly engage the flange 32 of the rim 30 when the lever arm 80 is urged in a downward direction as will be readily apparent with reference to the figures. Thus, when the lever arm is kept in this downward position, the tool 10 may be rocked at its foot 36 about the tire 26 to loosen and remove the rim from the tire without any possibility of the tool slipping out of engagement with the rim.

To further lock the tool on the rim and also to assist in effectively removing the rim from the tire, a further short tubular member 86 is slidably positioned adjacent the free ends of the lever arm 80 and includes a downwardly and inwardly curved hook portion 88. The member 86 is longitudinally adjustable upon the lever arm 80 in that the lever arm is provided with a plurality of longitudinally spaced apertures 90 for selectively receiving a pin 92 which extends through the tubular member 86. The hook member 88, when the lever arm 80 is in a downward operative position, can be made to engage the flange of the rim at a point diametrically opposite to that position of the rim which is already engaged by the feet 24, 36 and the hook 74. The hook member 88 is made longitudinally adjustable upon the elongated lever arm 80 to accommodate different sized tires and rims of different diameter.

Thus it will be seen that a novel pneumatic tool is provided for removing a tire from a rim which requires two simple manipulations, namely the depression of a trigger 72 to lower the foot 36 upon the tire and a lowering of the elongated lever arm 80 to lock the tool in place on diametrically opposite positions of the rim, so that subsequent rocking of the tool will effectively loosen and remove the rim from the tire.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A pneumatic tool for removing a tire from a rim having annular flanges, said tool comprising a tubular housing having a pair of laterally extending spaced feet at its lower end and adapted to engage underneath one of the annular flanges, a shank slidable in said housing and including a laterally extending foot at its lower end, resilient means normally urging said foot towards and between said pair of spaced feet, hydraulic means operatively connected with said housing to urge said foot away from said spaced feet, said foot being adapted to bear on a tire adjacent said one of its annular flanges, and means for locking the tool on the rim whereby said tool may be rocked on the tire to loosen it from the rim, said means including a pair of laterally extending downwardly and inwardly curved hook members carried by said housing above said pair of spaced feet and adapted to engage over said one of said annular flanges, an elongated lever arm pivoted at one of its ends to said housing above said hook members for movement in a vertical plane, said lever arm including a depending downwardly and inwardly curved laterally extending pressure member adjacent its pivoted end and adapted to underride said hook members and engage said flange when the longitudinal axis of the lever arm is substantially perpendicular to the longitudinal axis of the housing, and a further downwardly and inwardly curved hook longitudinally adjustable on the other end of the lever arm and adapted to engage said one of said annular flanges at a position diametrically opposite the position of engagement of said hook members with said rim.

ANTHONY B. MANUPELLO.

REFERENCES CITED

The following references are of record in the file of this patent:

UNITED STATES PATENTS

| Number | Name | Date |
|---|---|---|
| 1,507,208 | Schlenker | Sept. 2, 1924 |
| 1,806,947 | Mjelva | May 26, 1931 |
| 2,224,708 | Van Sittert | Dec. 10, 1940 |
| 2,495,117 | McCollister | Jan. 17, 1950 |
| 2,520,330 | Northrup et al. | Aug. 29, 1950 |

OTHER REFERENCES

Popular Mechanics Magazine, page 95, June 1941.